US008052569B2

(12) United States Patent
Tabata et al.

(10) Patent No.: US 8,052,569 B2
(45) Date of Patent: Nov. 8, 2011

(54) CONTROLLER OF POWER TRANSMISSION

(75) Inventors: Atsushi Tabata, Okazaki (JP); Ryuji Ibaraki, Nishikamo-gun (JP); Tooru Matsubara, Toyota (JP); Yukihiko Ideshio, Susono (JP); Hiroyuki Shibata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 868 days.

(21) Appl. No.: 12/090,901

(22) PCT Filed: Oct. 26, 2006

(86) PCT No.: PCT/JP2006/321347
§ 371 (c)(1),
(2), (4) Date: Apr. 21, 2008

(87) PCT Pub. No.: WO2007/049684
PCT Pub. Date: May 3, 2007

(65) Prior Publication Data
US 2009/0118095 A1    May 7, 2009

(30) Foreign Application Priority Data

Oct. 26, 2005   (JP) ................................ 2005-312066

(51) Int. Cl.
*B60K 1/02* (2006.01)
(52) U.S. Cl. ........................................................ 477/3
(58) Field of Classification Search .................. 477/3, 4
See application file for complete search history.

(56) References Cited

U.S. PATENT DOCUMENTS

| 5,915,801 | A | * | 6/1999 | Taga et al. ...................... 303/152 |
| 5,923,093 | A | * | 7/1999 | Tabata et al. ................. 290/40 C |
| 6,009,365 | A | * | 12/1999 | Takahara et al. ................ 701/54 |
| 7,672,770 | B2 | * | 3/2010 | Inoue et al. ..................... 701/70 |
| 2005/0209760 | A1 | | 9/2005 | Tabata et al. |

FOREIGN PATENT DOCUMENTS

| JP | 61 84454 | 4/1986 |
| JP | 8-251708 | 9/1996 |
| JP | 2000-264098 | 9/2000 |
| JP | 2003 127681 | 5/2003 |
| JP | 2005 162174 | 6/2005 |
| JP | 2005 256883 | 9/2005 |

OTHER PUBLICATIONS

U.S. Appl. No. 12/090,773, filed Apr. 18, 2008, Shibata, et al.

* cited by examiner

*Primary Examiner* — Justin Holmes
(74) *Attorney, Agent, or Firm* — Oblon, Spivak, McClelland, Maier & Neustadt, L.L.P.

(57) ABSTRACT

A control system for a power transmission system capable of speed change control in conformity of a deceleration demand. The transmission system includes at least two transmission units having different responsiveness to a speed change and capable of setting a speed change ratio individually, and in which a total speed change ratio is determined according to the speed change ratios of the transmission units. The control system includes a speed change control for changing a priority order to carry out a speed change operation of the individual transmission units to achieve a predetermined deceleration in conformity with a content of the deceleration demand, when the predetermined deceleration is demanded.

29 Claims, 11 Drawing Sheets

Fig. 5

|  | C1 | C2 | B1 | B2 | B3 | Speed Change Ratio | Step |
|---|---|---|---|---|---|---|---|
| 1st | O |  |  |  | O | 3.357 | 1.54 |
| 2nd | O |  |  | O |  | 2.180 | 1.53 |
| 3rd | O |  | O |  |  | 1.424 | 1.42 |
| 4th | O | O |  |  |  | 1.000 | 1.42 |
| 5th | O | O |  |  |  | 0.705 | Total 4.76 |
| R |  | O |  |  | O | 3.209 | |
| N |  |  |  |  |  |  | |

O Engagement

Fig. 11

|  | C1 | C2 | B1 | B2 | Speed Change Ratio | Step |
|---|---|---|---|---|---|---|
| 1st | O |  |  | O | 2.804 | 1.54 |
| 2nd | O |  | O |  | 1.531 | 1.53 |
| 3rd | O | O |  |  | 1.000 | 1.42 |
| 4th | O | O |  |  | 0.705 | Total 3.977 |
| R |  | O |  | O | 2.393 | |
| N |  |  |  |  |  | |

O Engagement

CONTROLLER OF POWER TRANSMISSION

TECHNICAL FIELD

This invention relates to a control system for a power transmission system comprising a plurality of transmission units having different responsiveness to a speed change and capable of setting a speed change ratio individually.

BACKGROUND ART

One example of a power transmission system comprising a plurality of transmission units having different responsiveness to a speed change is disclosed in Japanese Patent Laid-Open No. 2003-127681. According to the hybrid drive system disclosed in Japanese Patent Laid-Open No. 2003-127681, an internal combustion engine is connected with a carrier of a planetary gear mechanism, and a first motor/generator is connected with a sun gear of the planetary gear mechanism. Also, a ring gear is connected with a member of an input side of a geared automatic transmission. A member of an output side of the automatic transmission is connected with a propeller shaft, and a second motor/generator is connected with the propeller shaft. Thus, according to this drive unit for a hybrid vehicle, the planetary gear mechanism functions as a distribution mechanism distributing an engine power to the first motor/generator and to the transmission.

According to the system disclosed in Japanese Patent Laid-Open No. 2003-127681, a revolution frequency of the engine is varied continuously by changing a revolution frequency of the first motor/generator. That is, the planetary gear mechanism and the first motor/generator function as a continuously variable transmission. Consequently, a total speed change ratio of the drive unit for the hybrid vehicle is determined by the speed change ratio of the planetary gear mechanism functioning as a continuously variable transmission and the gear stage of the transmission arranged on the output side of the planetary gear mechanism.

As explained above, according to the system taught by Japanese Patent Laid-Open No. 2003-127681, the revolution frequency of the engine is varied by changing a revolution frequency of the first motor/generator. Therefore, a substantial speed change ratio of the planetary gear mechanism or the distribution mechanism is varied promptly. However, on the other hand, a shifting operation of the geared transmission is carried out by engaging and releasing frictional engagement devices. This means that the required time for the shifting operation of the geared transmission is relatively longer.

According to Japanese Patent Laid-Open No. 2003-127681, the transmission is provided for the purpose of improving a power transmission efficiency and a fuel economy by reducing a power transmission with a conversion of the power onto an electric power as much as possible even in case the vehicle is running under low load at high speed or running under high load at low speed, and downsizing the motor/generator. For this purpose, the gear stage of the transmission is shifted sequentially to the stage of smaller ratio with an increase in the vehicle speed, as a typical automatic geared transmission. On the other hand, a speed change ratio of the distribution mechanism is varied continuously by the first motor/generator. As a result, a total speed change ratio of the vehicle is set according to a running condition of the vehicle.

Thus, an entire speed change ratio, that is, the total speed change ratio is set by a speed change ratio of the continuously variable transmission unit and a gear stage of the geared transmission unit. However, a speed change operation is carried out in response to a change in the vehicle speed, an output demand, an accelerating operation, a decelerating operation and so on. That is, a content of a speed change demand is different depending on the situation. Therefore, if a speed change operation of the continuously variable transmission and a shifting operation of the geared transmission are always carried out on a consistent basis to approximate the total speed change ratio to the target speed change ratio, a speed change operation may not be carried out in conformity with such various demands concerning the speed change operation.

DISCLOSURE OF THE INVENTION

The present invention has been conceived noting the technical problems thus far described, and its object is to provide a control system for a power transmission system capable of controlling a speed change operation in complying with a speed change demand.

In order to achieve the above-mentioned object, according to the present invention, there is provided a control system for a power transmission system, which has at least two transmission units having different responsiveness to a speed change and capable of setting a speed change ratio individually, and in which a total speed change ratio is determined according to both of the speed change ratios of the transmission units, comprising: a speed change control means for changing a priority order to carry out a speed change operation of the individual transmission units to achieve a predetermined deceleration in conformity with a content of the deceleration demand, when the predetermined deceleration is demanded.

The speed change control means includes a means for changing a combination of the speed change ratios of the transmission units to set a total speed change ratio for achieving the demanded deceleration according to content of the deceleration demand.

The above-mentioned deceleration demand may be obtained from a speed change ratio outputted from a shifting device. The shifting device is adapted to output a speed change signal such as a downshift signal and an upshift signal, or a down range signal and an up range signal by a manual operation. More specifically, the shifting device may be adapted to output the downshift signal or the down range signal by selecting a manual position and then shifting a downshift position.

The transmission unit comprises an electrical transmission unit in which a speed change ratio thereof is varied electrically, and a mechanical transmission unit in which a speed change ratio thereof is changed by changing a torque transmitting point. Here, the speed change control means also includes a means for changing a control content of the mechanical transmission unit in conformity with a content of the deceleration demand.

More specifically, the transmission unit comprises an electrical transmission unit which has an electric motor and in which a speed change ratio thereof is varied by changing a revolution frequency of a prime mover by controlling a revolution frequency of the electric motor, and a mechanical transmission unit in which a speed change ratio thereof is changed by changing a torque transmitting point. Meanwhile, the speed change control means also includes a means for changing a control content of the electrical transmission unit in conformity with a content of the deceleration demand.

Those transmission units may be connected in tandem so as to input power outputted from any one of those transmissions to the other one. Therefore, a total speed change ratio is determined by speed change ratios of both of the transmission units.

The aforementioned power transmission system is mounted on a vehicle comprising a wheel brake for braking a wheel, and the control system of the invention further comprises a brake controlling means for maintaining a deceleration by actuating the wheel brake in the course of changing the speed change ratios of the speed change units.

Moreover, the speed change control means also includes a means for carrying out a speed change of the transmission unit having a better responsiveness in priority to the other one, in case an abrupt deceleration is demanded.

Further, the speed change control means also includes a means for determining a combination of the speed change ratios of the speed change units in accordance with a demanded target deceleration.

In addition to above, the power transmission system further comprises a regeneration mechanism for regenerating energy when decelerating the vehicle. On the other hand, the speed change control means also includes a means for determining a combination of the speed change ratios of the speed change units in accordance with a regeneration efficiency of the regeneration mechanism.

The electrical continuously variable transmission unit includes a differential gear mechanism, and a single pinion type planetary gear mechanism may be used as the differential gear mechanism.

The mechanical transmission unit comprises two or three sets of planetary gear mechanisms. The planetary gear mechanism may be a single pinion type planetary gear mechanism. In case the mechanical transmission unit comprises three sets of planetary gear mechanisms: sun gears of a first and a second planetary gear mechanisms are connected with each other; a ring gear of the first planetary gear mechanism, a carrier of the second planetary gear mechanism and a carrier of a third planetary gear mechanism are connected to one another, and those ring gear and carriers are connected with an output member; and a ring gear of the second planetary gear mechanism and a sun gear of the third planetary gear mechanism are connected with each other. In this case, the mechanical transmission unit is provided with: a first clutch selectively connecting the ring gear of the second planetary gear mechanism and the sun gear of the third planetary gear mechanism with the electrical continuously variable transmission unit; a second clutch selectively connecting the sun gears of the first and the second planetary gear mechanisms with the electrical continuously variable transmission unit; a first brake selectively fixing the sun gears of the first and the second planetary gear mechanisms; a second brake selectively fixing the carrier of the first planetary gear mechanism; and a third brake selectively fixing the ring gear of the third planetary gear mechanism.

In case the mechanical transmission unit comprises two sets of planetary gear mechanisms: sun gears of a first and a second planetary gear mechanisms are connected with each other; and a carrier of the first planetary gear mechanism and a ring gear of the second planetary gear mechanism are connected with each other, and those carrier and ring gear are connected with an output member. In this case, the mechanical transmission unit is provided with: a first clutch selectively connecting the ring gear of the first planetary gear mechanism with the electrical continuously variable transmission unit; a second clutch selectively connecting the sun gears of the first and the second planetary gear mechanisms with the electrical continuously variable transmission unit; a first brake selectively fixing the sun gears of the first and the second planetary gear mechanisms; and a second brake selectively fixing the carrier of the second planetary gear mechanism.

Additionally, according to the invention, a speed change may be carried out by determining a speed change ratio on the basis of a running condition of a vehicle on which the power transmission system is mounted and a speed change diagram prepared in advance.

Thus, according to the invention, in case a demand to achieve a predetermined speed change, more specifically, in case a demand to increase a deceleration is outputted, the transmission units to be controlled preferentially to carry out a speed change to fulfill the demand is determined on the basis of the content of deceleration demand. For example, in case an abrupt deceleration is demanded, the transmission unit having better responsiveness than that of the other transmission unit is controlled preferentially to carry out a speed change. Meanwhile, in case of regenerating energy by one of the transmission units, the transmission unit suitable for the energy regeneration is controlled preferentially to carry out a speed change. Therefore, a speed change operation can be carried out in conformity with the deceleration demand.

In addition to the above advantage, in case of setting an entire speed change ratio, in other words, in case of setting a total speed change ratio in conformity with the deceleration demand, a combination of the speed change ratios of the transmission units, that is, a ratio between the speed change ratios of the individual transmission units is changed according to a content of the deceleration demand. Therefore, the speed change operations of the transmission units can be controlled in conformity with the deceleration demand.

Moreover, in case of setting the total speed change ratio in conformity with the deceleration demand, the control content of the mechanical transmission unit is changed according to the content of the deceleration demand. Therefore, the total speed change ratio can be controlled in conformity with the deceleration demand.

Alternatively, the control content of the electrical transmission unit can also be changed according to the content of the deceleration demand, in case of setting a total speed change ratio in conformity with the deceleration demand. Therefore, the total speed change ratio can be controlled in conformity with the deceleration demand.

In addition to the above advantage, in case of achieving a target deceleration by carrying out speed change operations of the transmission units, a temporal degradation in the decelerations of the transmission units resulting from a structural factor of any of the transmission units can be compensated by a braking force of the wheel brake. Therefore, a temporal fluctuation in the deceleration can be minimized so that an uncomfortable feeling can be prevented.

In addition to the above advantage, in case an abrupt deceleration is demanded, the transmission unit having better responsiveness than that of the other transmission unit, e.g., the electrical transmission unit is controlled preferentially to carry out a speed change. Therefore, the demanded deceleration can be achieved without delay.

In addition to the above advantage, according to the invention, a combination of the speed change ratio of the transmission units is determined on the basis of the target deceleration. Therefore, a speed change can be carried out while selecting the transmission unit depending on the situation of the target deceleration. For example, the transmission unit to be controlled to carry out a speed change preferentially is selected in case the target deceleration diverges widely from the current deceleration, or in case the divergence between the target deceleration and the current deceleration is small. Therefore, the speed change operations of the transmission units can be controlled in conformity with the deceleration demand.

In addition to the above advantage, since the speed change ratios of the transmission units are determined on the basis of the energy regeneration efficiency, the energy regeneration can be carried out efficiently.

In addition to the above advantage, the control system of the invention is capable of carrying out a normal speed change control of determining a speed change ratio on the basis of a running condition of a vehicle and of a speed change diagram.

BRIEF DESCRIPTION OF THE DRAWINGS

FIG. 5 is a table showing gear stages set in the geared transmission unit and operating states of frictional engagement devices to set the gear stages.

FIG. 11 is a table showing gear stages set in the geared transmission unit shown in FIG. 10 and operating states of the frictional engagement devices to set the gear stages.

BEST MODE FOR CARRYING OUT THE INVENTION

Figure 4:
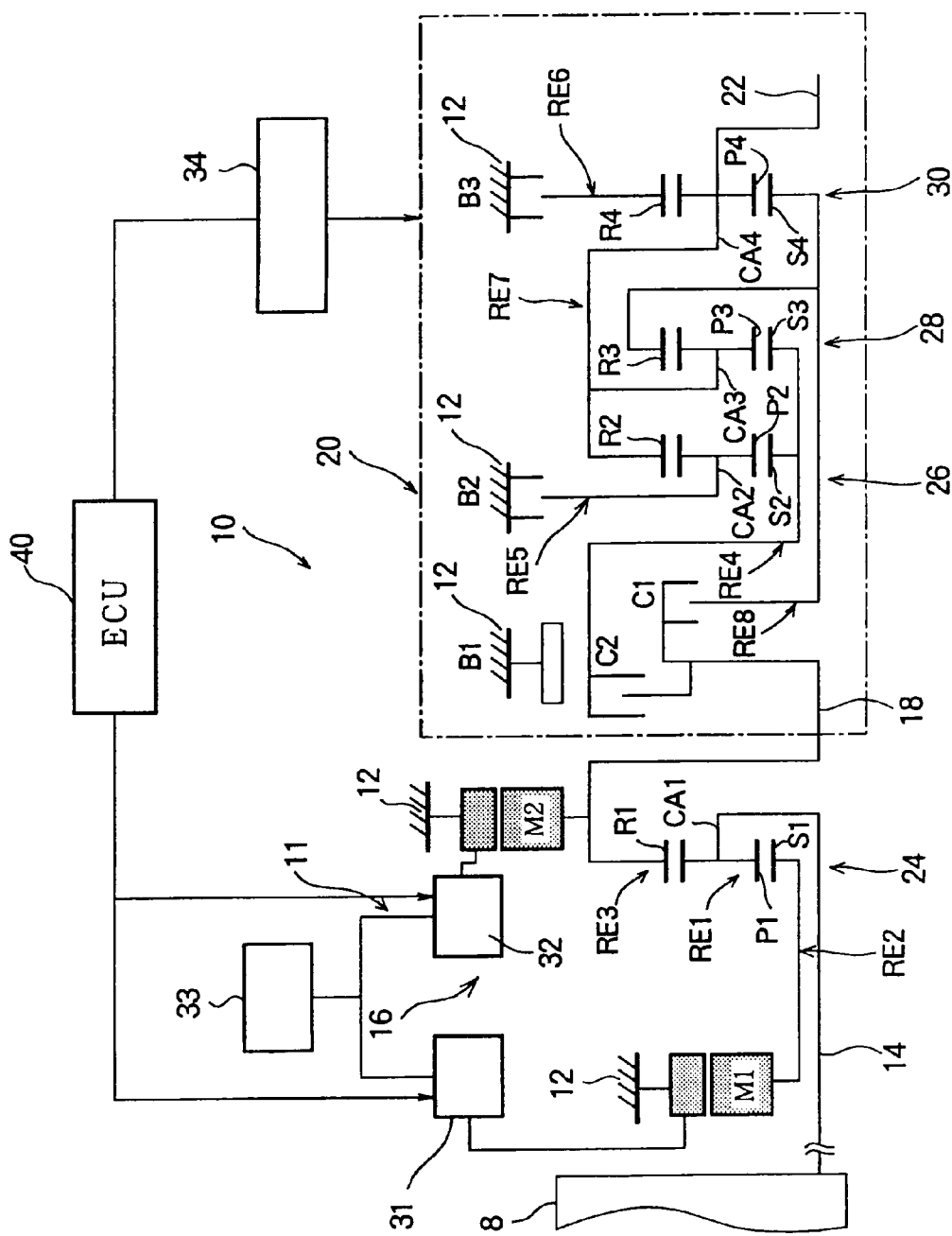
FIG. 4 is a skeleton diagram showing a drive unit of a hybrid vehicle to which the invention is applied.

Next, this invention will be described in connection with its specific examples. A power transmission system to which the invention is applied will be explained first of all. FIG. 4 is a skeleton diagram illustrating a transmission 10 for hybrid vehicles to which a control system as one example of the invention is applied. As illustrated in FIG. 4, the transmission 10 comprises, an input shaft 14 as an input rotary member arranged coaxially in a non-rotatable transmission case 12 (as will be called as a case 12 hereinafter) of a vehicle, an electrical continuously variable transmission unit 11 connected to the input shaft 14 directly or indirectly through a not shown pulsation absorbing damper (i.e., a vibration dampening device), a geared transmission unit 20 connected in tandem through a transmission member (i.e., a transmission shaft) 18 on a power transmission route between the continuously variable transmission unit 11 and a (not-shown) driving wheel, and an output shaft 22 as an output rotary member connected to the geared transmission unit 20. The above-listed elements are arranged in tandem in the transmission 10. This transmission 10 is suitable for front-engine rear-drive vehicles in which elements are arranged in tandem, and the transmission 10 is arranged between an engine as a prime mover for running and a pair of driving wheels 38. For example, a gasoline engine and a diesel engine or the like can be used as the engine 8 functioning as a prime mover. The engine 8 is connected to the input shaft 14 directly or indirectly through a not shown pulsation absorbing damper. Here, since the arrangement of the transmission 10 is symmetrical with respect to its axial line, a lower part thereof is omitted in the skeleton diagram of FIG. 4. The same applies to the following embodiments.

The continuously variable transmission unit 11 is a mechanism for mechanically distributing an output of the engine 8 inputted to a first electric motor M1 and to an input shaft 14. The continuously variable transmission unit 11 comprises a power distributing mechanism 16 functioning as a differential mechanism for distributing the output of the engine 8 to the first electric motor M1 and to the transmission member 18, and a second electric motor M2 arranged to rotate integrally with the transmission member 18. The second electric motor M2 may be arranged in any place on the power transmission route from the transmission member 18 to the driving wheel. According to this embodiment, both electric motors M1 and M2 are motor generators having a function to generate electric power. More specifically, the first electric motor M1 intrinsically has a function as a generator for establishing a reaction force, and the second electric motor M2 intrinsically has a function as a motor for outputting a driving force for running the vehicle.

The power distributing mechanism 16 is composed mainly of a single pinion type first planetary gear mechanism 24, and a gear ratio thereof is e.g., approximately "0.418" and it is represented by "ρ1". The first planetary gear mechanism 24 comprises following rotary elements, such as a first sun gear S1, a first planetary gear P1, a first carrier CA1 holding the first planetary gear P1 in a rotatable and revolvable manner, and a first ring gear R1 meshing with the first sun gear S1 through the first planetary gear P1. The aforementioned gear ratio ρ1 is expressed as ZS1/ZR1. ZS1 represents a teeth number of the first sun gear S1, and ZR1 represents a teeth number of the first ring gear R1.

In the power distributing mechanism 16, the first carrier CA1 is connected to the input shaft 14, i.e., to the engine 8, the first sun gear S1 is connected to the first electric motor M1, and the first ring gear R1 is connected to the transmission member 18. A differential action of the power distributing mechanism 16 is achieved by allowing to rotate three elements of the first planetary gear mechanism 24, i.e., to rotate the first sun gear S1, the first carrier CA1 and the first ring gear R1 relatively among each other. As a result, the output of the engine 8 is distributed to the first electric motor M1 and to the transmission member 18, and the electric energy generated by the first electric motor M1 operated by a part of the output of the engine 8 is stored or drives the second electric motor M2. In consequence, the continuously variable transmission unit 11 (or the power distributing mechanism 16) functions as an electrical differential mechanism to achieve a "continuously variable transmission state (i.e., an electrical CVT state) where a differential ratio is varied continuously)", so that the revolution frequency of the engine 8 is varied continuously without varying the revolution frequency of the transmission member 18. In short, when the power distributing mechanism 16 is performing the differential action, the continuously variable transmission unit 11 is also performing the differential action. Specifically, the continuously variable transmission unit 11 functions as an electrical continuously variable transmission, in which its speed change ratio Y0 (i.e., revolution frequency of the input shaft 14/revolution frequency of the transmission member 18) is varied continuously from a minimum value Y0min to a maximum value Y0max.

The geared transmission unit 20 comprises a single pinion type second planetary gear mechanism 26, a single pinion type third planetary gear mechanism 28 and a single pinion type fourth planetary gear mechanism 30. The second planetary gear mechanism 26 comprises a second sun gear S2, a second planetary gear P2, a second carrier CA2 holding the second planetary gear P2 in a rotatable and revolvable manner, and a second ring gear R2 meshing with the second sun gear S2 through the second planetary gear P2. The second planetary gear mechanism 26 has a predetermined gear ratio ρ2 which is approximately "0.562". The third planetary gear mechanism 28 comprises a third sun gear S3, a third planetary gear P3, a third carrier CA3 holding the third planetary gear P3 in a rotatable and revolvable manner, and a third ring gear R3 meshing with the third sun gear S3 through the third planetary gear P3. The third planetary gear mechanism 28 has a predetermined gear ratio ρ3 which is approximately "0.425". The fourth planetary gear mechanism 30 comprises a fourth sun gear S4, a fourth planetary gear P4, a fourth carrier CA4 holding the fourth planetary gear P4 in a rotatable and revolvable manner, and a fourth ring gear R4 meshing with the fourth sun gear S4 through the fourth planetary gear P4. The fourth planetary gear mechanism 30 has a predetermined gear ratio ρ4 which is approximately "0.421". The aforementioned gear ratios ρ2 is expressed as ZS2/ZR2, ρ3 is expressed as ZS3/ZR3, and ρ4 is expressed as ZS4/ZR4. Here, ZS2 represents a teeth number of the second sun gear S2, ZR2 represents a teeth number of the second ring gear R2, ZS3 represents a teeth number of the third sun gear S3, ZR3 represents a teeth number of the third ring gear R3, ZS4 represents a teeth number of the fourth sun gear S4, and ZR4 represents a teeth number of the fourth ring gear R4.

Here will be explained a relation of connection in the geared transmission unit 20. The second sun gear S2 and the third sun gear S3 are connected integrally with each other. Those sun gears S2 and S3 are connected selectively to the transmission member 18 through the second clutch C2, and also connected selectively to the case 12 through a first brake B1. The second carrier CA2 is connected selectively to the case 12 through a second brake B2. The fourth ring gear R4 is connected selectively to the case 12 through a third brake B3. The second ring gear R2, the third carrier CA3 and the fourth carrier CA4 are connected integrally, and they are connected to the output shaft 22. The third ring gear R3 and the fourth sun gear S4 are connected integrally, and they are connected selectively to the transmission member 18 through the first clutch C1.

The aforementioned first clutch C1, second clutch C2, first brake B1, second brake B2 and third brake B3 are hydraulic frictional engagement devices generally used in conventional automatic transmissions for a vehicle. Those hydraulic frictional engagement devices are composed mainly of a wet multiple disc clutch in which a plurality of frictional discs facing with each other are pressed by a hydraulic actuator, a band brake in which one of the end of one or two band(s) applied to an outer circumferential face of a rotating drum is (are) wound up by a hydraulic actuator, and so on. The role of the hydraulic frictional engagement device is to connect the members of both sides thereof selectively.

According to the transmission 10 thus far explained, as indicated in the table of FIG. 5, any of first gear stage (represented as 1st in the table) to a fifth gear stage (represented as 5th in the table), reverse gear stage (represented as R in the table), and neutral (represented as N in the table) are established by selectively activating the aforementioned elements, specifically, by selectively engaging the first clutch C1, the second clutch C2, the first brake B1, the second brake B2 and the third brake B3. As a result, a speed change ratio Y (i.e., input shaft speed NIN/output shaft speed NOUT), which changes substantially in equal ratio at every gear stage is obtained. It is to be especially noted that "the continuously variable transmission state" where the transmission 10 functions as an electrical continuously variable transmission is achieved by both of the continuously variable transmission unit 11 and the geared transmission unit 20.

Here will be explained engagement statuses of the case in which the transmission 10 functions as a geared transmission by fixing the speed change ratio of the continuously variable transmission unit 11. For example, as shown in FIG. 5: the first gear stage where the maximum value of a speed change ratio Y1 is approximately "3.357" is achieved by engaging the first clutch C1 and the third brake B3; the second gear stage where a speed change ratio Y2 is smaller than the speed change ratio of the first gear stage, e.g., approximately "2.180" is achieved by engaging the first clutch C1 and the second brake B2; the third gear stage where a speed change ratio Y3 is smaller than the speed change ratio of the second gear stage, e.g., approximately "1.424" is achieved by engaging the first clutch C1 and the first brake B1; the fourth gear stage where a speed change ratio Y4 is smaller than the speed change ratio of the third gear stage, e.g., approximately "1.000" is achieved by engaging the first clutch C1 and the second clutch C2; and the fifth gear stage where a speed change ratio Y5 is smaller than the speed change ratio of the fourth gear stage, e.g., approximately "0.705" is achieved by engaging the first clutch C1 and the second clutch C2. The reverse gear stage where a speed change ratio YR is between the speed change ratios of the first and the second gear stages, e.g., "3.209" is achieved by engaging the second clutch C2 and the third brake B3. Additionally, all of the frictional engagement devices are released to achieve Neutral.

Meanwhile, in case the transmission 10 functions as a continuously variable transmission, the continuously variable transmission unit 11 functions as a continuously variable transmission, and the geared transmission unit 20 arranged in tandem therewith functions as a geared transmission. As a result, the input revolution to the geared transmission unit 20, more specifically, the revolution frequency of the transmission member 18 to be inputted individually to the first to fourth gear stages of the geared transmission unit 20 is varied continuously, and the individual gear stages thereby obtaining a continuous range of the speed change ratio. For this reason, the speed change ratio can be varied steplessly and continuously even between the gear stages. Consequently, a speed change ratio YT achieved by the continuously variable transmission unit 11 and the geared transmission unit 20, more specifically, a total speed change ratio YT as an entire speed change ratio of the transmission 10, which is governed by both of the speed change ratio Y0 of the continuously variable transmission unit 11 and the speed change ratio Y of the geared transmission unit 20, can be varied steplessly.

Figure 6:
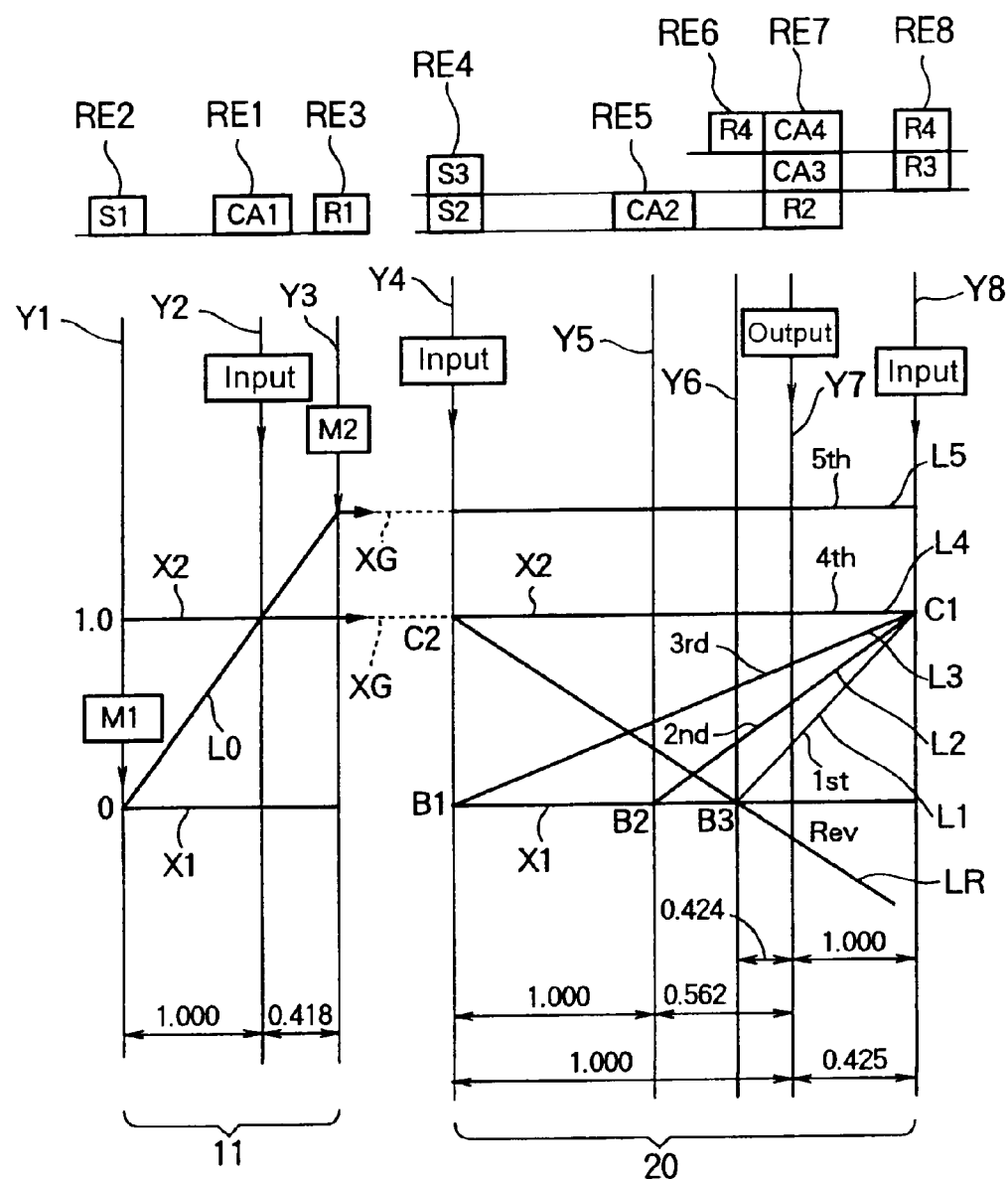
FIG. 6 is a nomographic diagram explaining operating states of the transmission units shown in FIG. 4.

FIG. 6 is a nomographic diagram linearly indicating a relation of revolution frequencies of the rotary elements to be connected depending on the gear stage, in the transmission 10 comprising the continuously variable transmission unit 11 functioning as a differential unit or a first transmission unit, and the geared transmission unit 20 functioning as a (an automatic) transmission unit or a second transmission unit. The nomographic diagram of FIG. 6 is a two-dimensional coordinate composed of abscissa axes indicating relations of the gear ratios "ρ" of individual planetary gear mechanisms 24, 26, 28 and 30, and longitudinal axes indicating relative revolution frequencies. In the diagram, the bottom abscissa axis X1 represents "zero" revolution, and the middle abscissa axis X2 represents the revolution frequency of "1.0", i.e., a revolution frequency Ne of the engine 8 connected with the input shaft 14, and an abscissa axis XG represents a revolution frequency of the transmission member 18.

Meanwhile, three longitudinal axes Y1, Y2 and Y3 individually indicates relative revolution frequencies of three elements of the power distribution mechanism 16 of the continuously variable transmission unit 11. Specifically, Y1 indicates relative revolution frequency of the first sun gear S1 corresponding to a second rotary element (or a second element) RE2, Y2 indicates relative revolution frequency of the first carrier CA1 corresponding to a first rotary element (or a first element) RE1, and Y3 indicates relative revolution frequency of the first ring gear R1 corresponding to a third rotary element (or a third element) RE3. Clearances between those longitudinal axes Y1 to Y3 are determined individually in accordance with a gear ratio $\rho1$ of the first planetary gear mechanism 24. Five longitudinal axes Y4 to Y8 individually represent the rotary elements of the geared transmission unit 20. Specifically, Y4 represents the mutually connected second sun gear S2 and third sun gear S3 corresponding to a fourth rotary element (or a fourth element) RE4, Y5 represents the second carrier CA2 corresponding to a fifth rotary element (or a fifth element) RE5, Y6 represents the fourth ring gear R4 corresponding to a sixth rotary element (or a sixth element) RE6, Y7 represents the mutually connected second ring gear R2, third carrier CA3 and fourth carrier CA4 corresponding to a seventh rotary element (or a seventh element) RE7, and Y8 represents the mutually connected third ring gear R3 and fourth sun gear S4 corresponding to an eighth rotary element (or a eighth element) RE8. Clearances between those longitudinal axes Y4 to Y8 are determined individually in accordance with a gear ratios $\rho2$, $\rho3$ and $\rho4$ of the second to fourth planetary gear mechanisms 26, 28 and 30. Provided that the clearance between the longitudinal axes representing the sun gear and the carrier is set to "1", the clearance between the longitudinal axes representing the carrier and the ring gear indicates the gear ratio $\rho$ of the planetary gear mechanism. Specifically, in the continuously variable transmission unit 11, the clearance between the longitudinal axes Y1 and Y2 is set to "1", and the clearance between Y2 and Y3 is set to the gear ratio $\rho1$. In the second to fourth planetary gear mechanisms 26, 28 and 30 of the geared transmission unit 20, also, each clearance between the sun gear and the carrier is set to "1" and each clearance between the carrier and the ring gear is set to "$\rho$".

As can be seen from the nomographic diagram in FIG. 6, in the power distribution mechanism 16 (or the continuously variable transmission unit 11) of the transmission 10 of this embodiment, the first rotary element RE1 (or the first carrier CA1) of the first planetary gear mechanism 24 is connected to the input shaft 14, i.e., to the engine 8, the second rotary element RE2 is connected to the first electric motor M1, and the third rotary element RE3 (or the first ring gear R1) is connected to the transmission member 18 and to the second electric motor M2. Therefore, a rotation of the input shaft 14 is transmitted (i.e., inputted) to the geared transmission unit 20 via the transmission member 18. The relation between the revolution frequencies of the first sun gear S1 and the first ring gear R1 is indicated by a slant line L0 passing through an intersection of Y2 with X2.

If the revolution frequency of the first sun gear S1 indicated at the intersection of the line L0 with the longitudinal axis Y1 is fluctuated by controlling the reaction force resulting from a generation of the first electric motor M1, the revolution frequency of the first ring gear R1 indicated at the intersection of the line L0 with the longitudinal axis Y3 is fluctuated.

On the other hand, in the geared transmission unit 20, the fourth rotary element RE4 is connected selectively to the transmission member 18 through the second clutch C2 and selectively to the case 12 through the first brake B1, the fifth rotary element RE5 is connected selectively to the case 12 through the second brake B2, the sixth rotary element RE6 is connected selectively to the case 12 through the third brake B3, the seventh rotary element RE7 is connected to the output shaft 22, and the eighth rotary element RE8 is connected selectively to the transmission member 18 through the first clutch C1.

As shown in FIG. 6, in the geared transmission unit 20, a revolution frequency of the output shaft 22 at the first gear stage is indicated at the intersection of the slant line L1 with the longitudinal axis Y7 indicating the revolution frequency of the seventh rotary element RE7 connected to the output shaft 22. Here, the line L1 is determined as a result of an engagement of the first clutch C1 and the third brake B3, and it extends from the intersection of the longitudinal axis Y6 indicating the revolution frequency of the sixth rotary element RE6 with the abscissa axis X1, to the intersection of the longitudinal axis Y8 indicating the revolution frequency of the eighth rotary element RE8 with the abscissa axis X2. As in the case of the first gear stage: a revolution frequency of the output shaft 22 at the second gear stage is indicated at the intersection of the longitudinal axis Y7 with a slant line L2 determined as a result of engaging the first clutch C1 and the second brake B2; a revolution frequency of the output shaft 22 at the third gear stage is indicated at the intersection of the longitudinal axis Y7 with a slant line L3 determined as a result of engaging the first clutch C1 and the first brake B1; and a revolution frequency of the output shaft 22 at the fourth gear stage is indicated at the intersection of the longitudinal axis Y7 with a horizontal line L4 determined as a result of engaging the first clutch C1 and the second clutch C2. At the aforementioned first to fourth gear stages, the power is inputted from the continuously variable transmission unit 11 or the power distribution mechanism 16 to the eighth rotary element RE8 at the revolution frequency identical to the revolution frequency Ne of the engine 8 by controlling the revolution frequency of the first electric motor M1. On the other hand, in case the first sun gear S1 is fixed by halting the rotation of the first electric motor M1, the power from the continuously variable transmission unit 11 is inputted at the revolution frequency higher than the revolution frequency NE of the engine 8. Therefore, a revolution frequency of the output shaft 22 at the fifth gear stage is indicated at the intersection of the longitudinal axis Y7 with a horizontal line L5 determined as a result of engaging the first clutch C1 and the second clutch C2.

In order to control the first electric motor M1, there is provided a first controller 31. Also, in order to control the second electric motor M2, there is provided a second controller 32. Those controllers 31 and 32 are composed mainly of an inverter, for example. The roles of those controllers 31 and 32 are to operate the individual electric motors M1 and M2 as electric motors or generators, and to control the revolution frequencies and the torques thereof depending on the situation. The electric motors M1 and M2 are individually connected with an electric storage device 33 through the controllers 31 and 32. The electric storage device 33 feeds electric power to the electric motors M1 and M2, and stores the electric power generated by the electric motors M1 and M2 in case those electric motors M1 and M2 function as generators.

The electric storage device 33 is composed mainly of a secondary battery and a capacitor.

Also, in order to control engaging pressure and releasing pressure for the aforementioned clutches and brakes, there is provided a hydraulic control unit 34. The functions of the hydraulic control unit 34 are to regulate oil pressure established by an (not shown) oil pump to a line pressure, to control the engaging pressure of the individual frictional engagement devices based on the line pressure as an initial pressure, and to control the releasing pressure to release the frictional engagement devices. Specifically, known hydraulic control units used in automatic transmissions may be employed as the hydraulic control unit 34.

Figure 7:
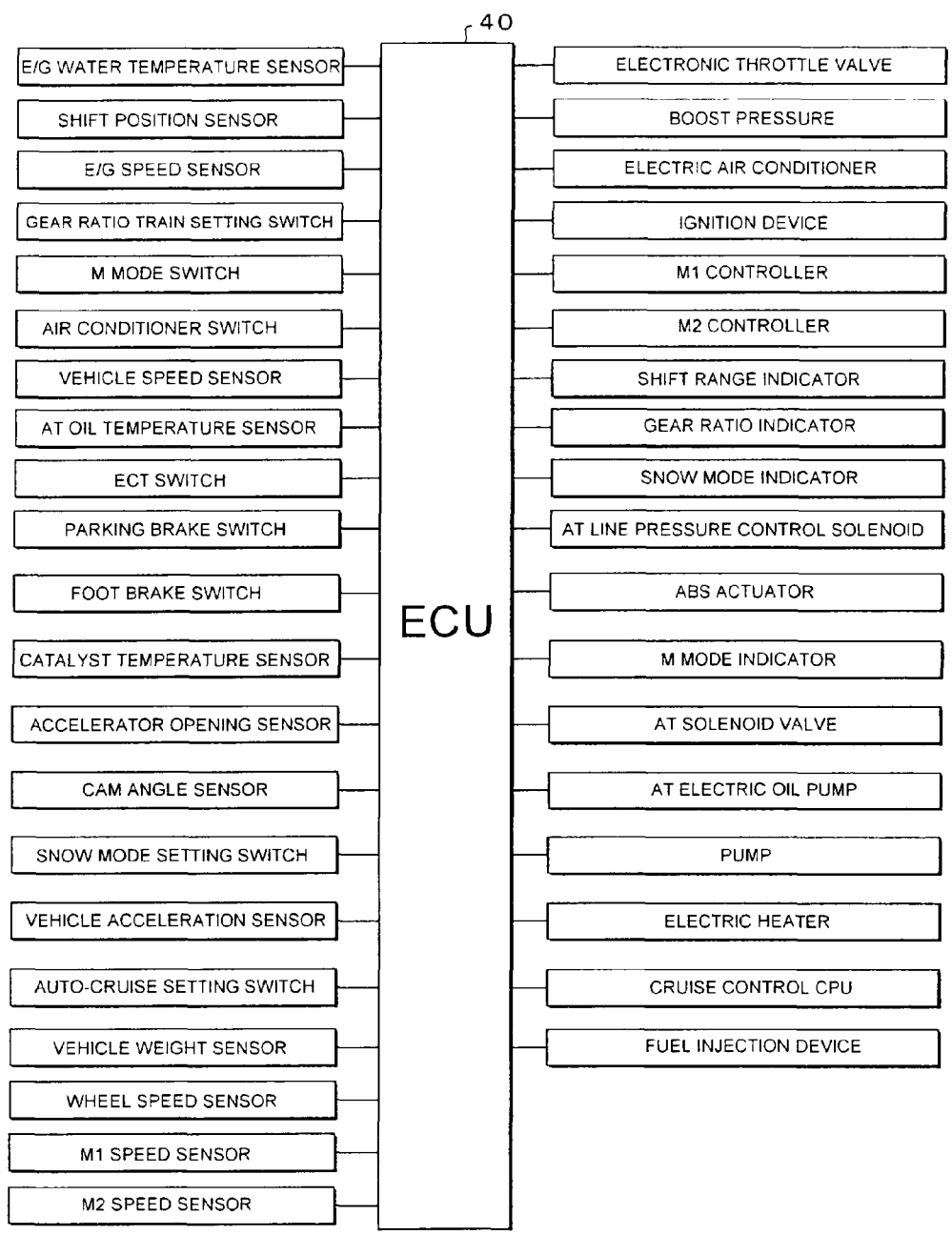
FIG. 7 is diagram showing an example of input signals and output signals of an electronic control unit.

Further, there is provided an electronic control unit (ECU) 40 for controlling the transmission 10 entirely by controlling the aforementioned controllers 31 and 32, and the hydraulic control unit 34 by electronic signals. The signals inputted to the electronic control unit 40, and the signals outputted form the electronic control unit 40 are indicated in FIG. 7. The electronic control unit 40 comprises a microcomputer composed mainly of CPU, ROM, RAM and an input/output interface and so on. The electronic control unit 40 carries out drive controls, e.g., a hybrid drive control of the engine 8 and the first and the second electric motors M1 and M2, and a shift control of the geared transmission unit 20, by carrying out a signal process in accordance with a program stored in ROM in advance while utilizing a temporal storage function of RAM.

As shown in FIG. 7, a signal indicating a water temperature of the engine, a signal indicating a shift position, a signal indicating the revolution frequency Ne of the engine 8, a signal indicating the gear ratio train setting value, a signal instructing M mode (i.e., a motor running mode), a signal indicating an operation of an air-conditioner, a signal indicating a vehicle speed corresponding to the revolution frequency NOUT of the output shaft 22, a signal indicating an oil temperature of an operating oil (i.e., an AT oil temperature) of the geared transmission unit 20, a signal indicating an operation of a parking brake, a signal indicating an operation of a foot brake, a signal indicating a temperature of a catalyst, an accelerator opening signal indicating a stepping amount of the accelerator corresponding to an output demand of the driver, a cam angle signal, a signal indicating a snow mode setting, an acceleration signal indicating a longitudinal acceleration of the vehicle, a signal indicating an auto-cruise running, a signal indicating a weight of the vehicle, a signal indicating a speed of individual wheels, a signal indicating a revolution frequency of the first electric motor M1, a signal indicating a revolution frequency of the second electric motor M2 and so on, are inputted to the electronic control unit 40.

On the other hand, a driving signal to a throttle actuator for controlling an opening of an electronic throttle valve, a fuel feeding signal for controlling a feeding amount of the fuel from a fuel injection device to the engine 8, a boost regulating signal for regulating a boost pressure, a signal for activating the electric air-conditioner, an ignition signal for commanding a timing to ignite the engine 8 by an ignition device, a command signal for commanding an operation of the electric motors M1 and M2, a shift position (or an operating position) indicating signal for activating a shift indicator, a signal indicating a gear ratio, a signal indicating a snow mode, a signal for activating an ABS actuator for preventing a slippage of the wheel at a braking time, an M mode indication signal indicating that M mode is selected, a valve command signal for activating a solenoid valve of the hydraulic control unit 34 so as to control the hydraulic actuator of the hydraulic frictional engagement devices of the geared transmission unit 20, a drive command signal for activating an electric hydraulic pump as a hydraulic source of the hydraulic control unit 34, a signal for activating an electric heater, a signal to a computer for carrying out a cruise control and so on, are outputted from the electronic control unit 40.

Figure 8:
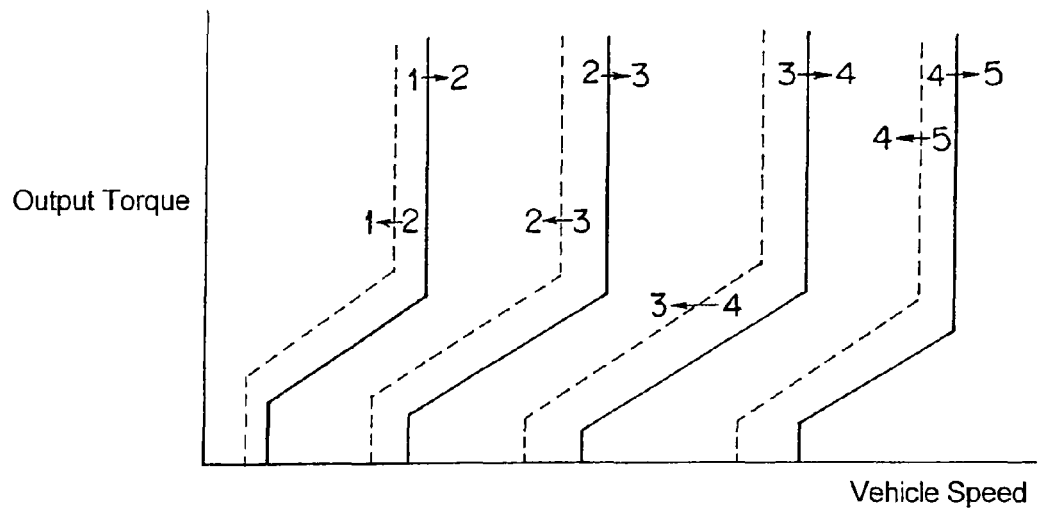
FIG. 8 is a diagram schematically showing one example of a speed change diagram of the mechanical transmission unit.

FIG. 8 shows a shifting diagram used for a shifting control of the geared transmission unit 20. In FIG. 8, an abscissa axis represents a vehicle speed and a longitudinal axis represents an output torque demand, and gear stage regions are defined using the vehicle speed and the output demand as parameters. Also, in FIG. 8, solid lines are upshift lines as boundaries of the individual gear stage regions for the case of upshifting, and broken lines are downshift lines as boundaries of the individual gear stage regions for the case of downshifting.

Figure 9:
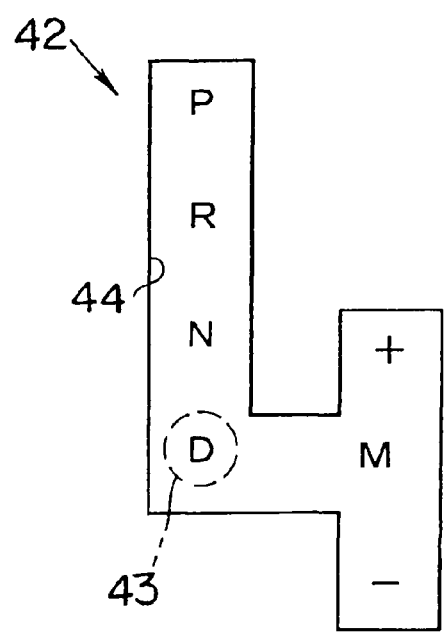
FIG. 9 is a diagram showing one example of an arrangement of a shift position of a shifting device.

All of those gear stages can be established in case a Drive range (i.e., drive position) is selected, however, the gear stages of high speed side are restricted under a manual shifting mode (i.e., manual mode). FIG. 9 illustrates an arrangement of shift positions in a shifting device 42 for outputting a shift position signal to the aforementioned electronic control unit 40. In the shifting device 42, a Parking (P) for keeping the vehicle being stopped, a Reverse (R), a Neutral (N) and a Drive (D) positions are arranged linearly in an anteroposterior direction of the vehicle. A Manual position (M) is arranged adjacent to the Drive position (D) in the width direction of the vehicle, and an upshift position (+) and a downshift position (−) are arranged above and below the manual position. Those shift positions are connected through a guide groove 44 guiding a shift lever 43. Therefore, the shift position is selected arbitrary by moving the shift lever 43 along the guide groove 44, and the shift position signal of selected position is inputted to the electronic control unit 40.

In case the Drive position is selected, all of the forward stages of the geared transmission unit 20 from the first to fifth stages can be set depending on a running condition. On the other hand, in case the shift lever 43 is moved from the Drive position to the Manual position, the Drive position is maintained and a shifting can be made up to the fifth stage. However, in this case, a downshift signal (i.e., a down range signal) is outputted each time the shift lever 43 is moved to the downshift position. As a result, the gear stage is shifted sequentially to a 4th range where the fifth stage is inhibited, a 3rd range where the fourth or higher stages are inhibited, a 2nd range where the third or higher stages are inhibited, and an L range where the gear stage is fixed to the first stage. To the contrary, an upshift signal is outputted each time the shift lever 43 is moved to the upshift position, so that the gear stage is shifted sequentially to the higher range.

In order to drive the engine 8 at the revolution where the fuel economy is optimum while fulfilling a drive torque demand, and to drive the vehicle with good power transmission efficiency by reducing a conversion amount of the electric power, in the transmission 10, a gear stage of the geared transmission unit 20 is set according to the vehicle speed when the vehicle speed is within a predetermined range, and a speed change ratio of the continuously variable transmission unit 11 is varied continuously in this situation. Meanwhile, in case the running condition across the gear stage regions shown in the shifting diagram of FIG. 8, the geared transmission unit 20 is shifted in line with the shifting diagram. Specifically, the frictional engagement devices are engaged and released according to the gear stages listed in FIG. 5. The gear stage of the geared transmission unit 20 is thus shifted stepwise. Therefore, in order to prevent or minimize a change in the engine revolution, the speed change ratio of the continuously variable transmission unit 11 is varied in the direction opposite to the changing direction of the speed change ratio of the geared transmission unit 20. For example, in case of carrying out a downshifting of the geared transmission unit 20, revolution frequencies of the eighth rotary element RE8 (i.e., the third ring gear R3 and fourth sun gear S4) as an input element shown in FIG. 4 are raised by an increase in the speed change ratio of the geared transmission unit 20. As a result, a revolution frequency of the first ring gear R1 connected with the eighth rotary element RE8 through the first clutch C1, as well as a revolution frequency of the first electric motor M1 are raised. This control is carried out to raise the revolution frequency of the first ring gear R1 to keep the engine revolution as much as possible. For this purpose, the engine revolution is lowered relatively, and an upshifting of the continuously variable transmission unit 11 is carried out.

As explained above, a total speed change ratio of the transmission 10 is set by both of the speed change ratios of the continuously variable transmission 11 unit and the geared transmission 20 unit. However, the speed change ratios of the continuously variable transmission 11 unit and the geared transmission 20 unit are combined in various combinations to set a predetermined total speed change ratio. Also, as explained above, the speed change of the continuously variable transmission unit 11 is carried out by varying a revolution frequency of the first electric motor M1, and on the other hand, a speed change of the geared transmission 20 is carried out by engaging or releasing the clutches C1 and C2 and brakes B1 to B3. This means that a speed changing rate of the continuously variable transmission unit 11 as well as responsiveness of the continuously variable transmission unit 11 to a speed change are better than those of the geared transmission 20. In addition, the second electric motor M2 is connected with the continuously variable transmission unit 11, therefore, a generating amount of electric power and a generating efficiency may be varied depending on an operating state of the continuously variable transmission unit 11. The control system of the invention is adapted to control the speed change operation in conformity with a deceleration demand utilizing diverseness to set a speed change ratio in the transmission 10.

Figure 1:
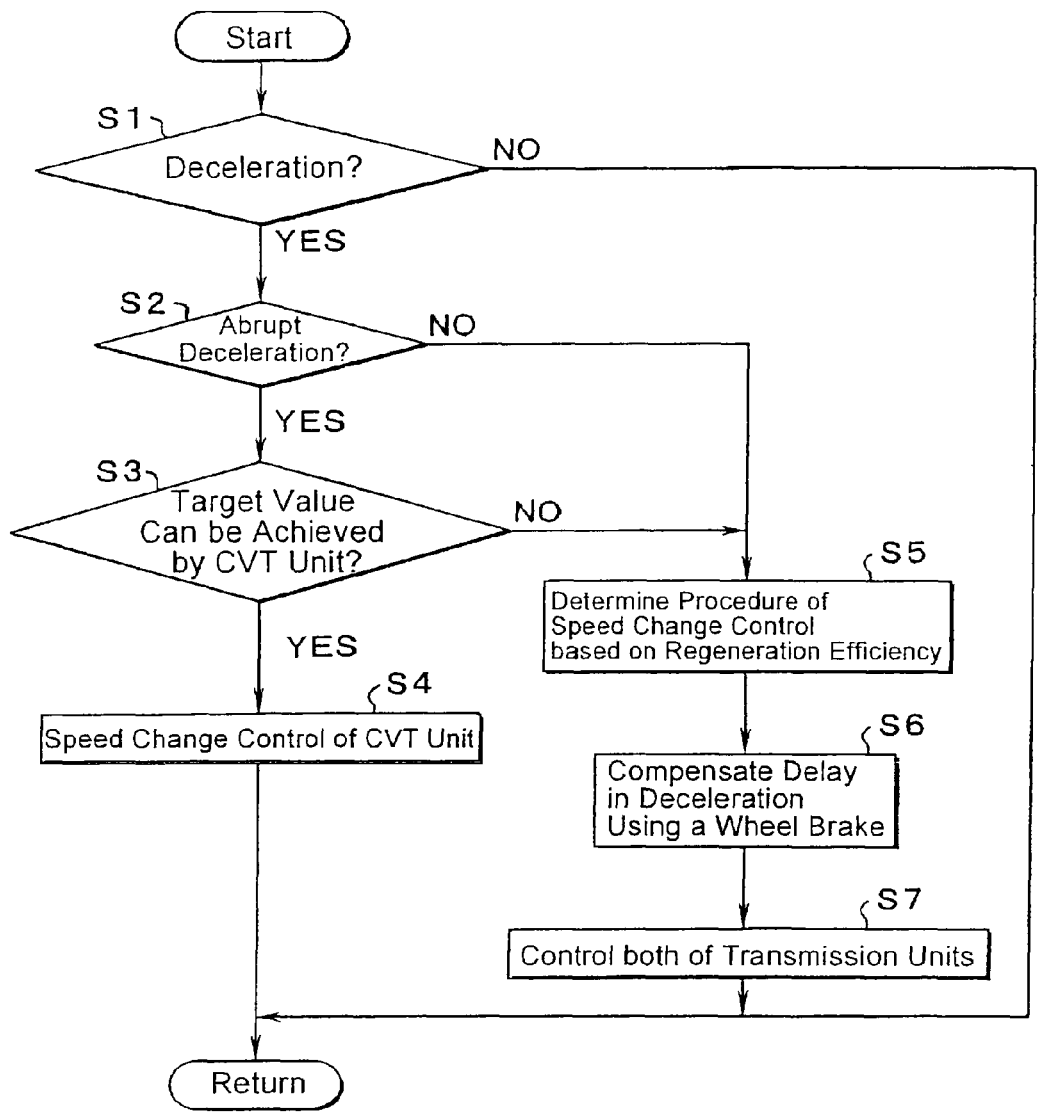
FIG. 1 is a flowchart showing one example of the speed change control carried out by the control system of the invention.

FIG. 1 is a flowchart explaining a control example. In this example, first of all, it is judged whether or not a deceleration is demanded (at Step S1). For example, an existence of the deceleration demand is judged in case a not shown accelerator pedal is returned so that an output demand is eliminated, in case the shift lever 43 is moved to the downshift position in the shifting device 42, in case a distance from a vehicle running in front is too close when the vehicle is controlled to follow the front vehicle using a not shown radar cruise system or the like.

In case the answer of Step S1 is NO, the routine is returned without carrying out any specific control. To the contrary, in case the answer of Step S1 is YES, it is judged whether or not an abrupt deceleration is demanded (at Step S2). The abrupt deceleration can be judged from a stepping amount or a changing rate of an opening degree of the accelerator pedal, a number of times to move the shift lever 43 to the downshift position per unit of time, an approaching speed to the front vehicle and so on. In case the answer of Step S2 is YES, a target value of the deceleration or the speed change ratio is calculated based on the content of the deceleration demand, and it is judged whether or not the obtained target value can be achieved only by carrying out a speed change of the continuously variable transmission unit 11 (at Step S3).

Figure 2:
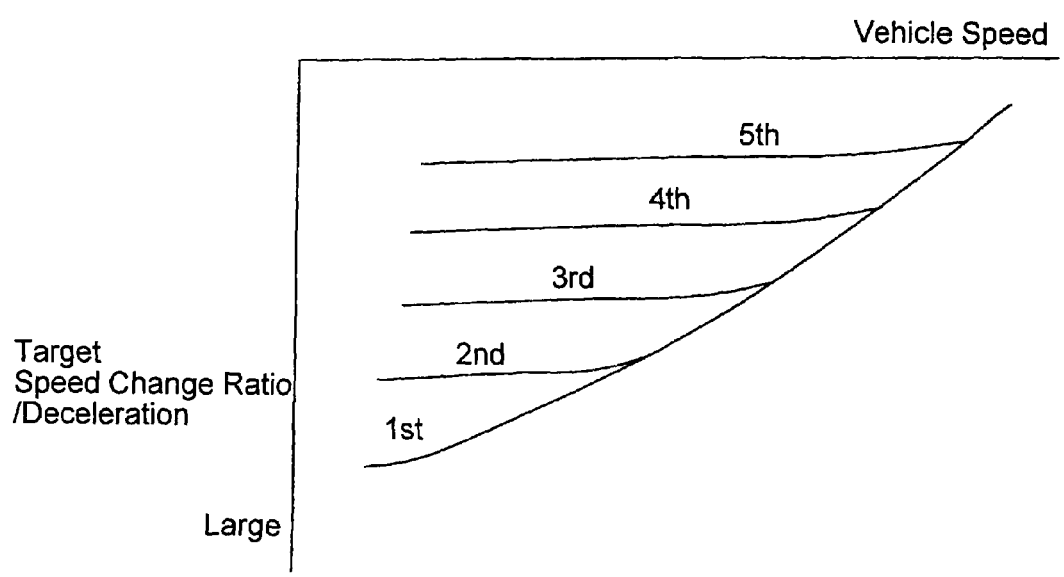
FIG. 2 is a diagram schematically showing a relation between the target speed change ratio or target deceleration and the vehicle speed and the speed change ratio of a geared transmission unit.

As shown in FIG. 2, the above-mentioned target deceleration and the target speed change ratio can be prepared in advance as a map. FIG. 2 shows one example of the map in which a deceleration or a speed change ratio is set according to a vehicle speed. In FIG. 2, notations "1st" to "5th" individually represent a speed change ratio (i.e., a gear stage) of the geared transmission unit 20. As can be seen from FIG. 2, the deceleration can be obtained higher than the each line representing the gear stages. Here, a deceleration or a speed change ratio between the lines representing the gear stages can be achieved by carrying out a speed change of the continuously variable transmission unit 11. Accordingly, in case the target deceleration is large, the speed change ratio of the geared transmission 20 is to be increased. However, on the other hand, in case the target deceleration is medium or small, a medium or small total speed change ratio can be set by increasing the speed change ratio of the geared transmission unit 20 while decreasing the speed change ratio of the continuously variable transmission unit 11, instead of setting the speed change ratio of the geared transmission unit 20 to the medium or small value. In this case, if the total speed change ratio is to be varied widely to achieve the target deceleration and a variation width of the total speed change ratio exceeds an intrinsic variation range of the speed change ratio of the continuously variable transmission unit 11, the target deceleration cannot be achieved only by carrying out a speed change of the continuously variable transmission unit 11.

In case the target value can be achieved only by carrying out of a speed change of the continuously variable transmission unit 11 so that the answer of Step S3 is YES, a speed change control of the continuously variable transmission unit 11 is carried out (at Step S4), and then, the routine is returned. As explained above, the deceleration can be achieved by the power source braking force, and larger deceleration can be obtained by increasing the speed change ratio. For this reason, a downshift control of the continuously variable transmission unit 11 is carried out at Step S4. Specifically, a revolution frequency of the engine 8 is raised by raising a revolution frequency of the first electric motor M1 shown in FIG. 4. As a result, a drag resistance of the engine 8 is increased so that the deceleration of the entire vehicle is increased. Thus, the speed change operation of this case can be carried out by electrically varying the revolution frequency of the first electric motor M1 in the continuously variable transmission unit 11. That is, the responsiveness to the speed change operation of this case is better than that of the case of carrying out a speed change of the geared transmission unit 20.

To the contrary, in case the deceleration demanded is not an abrupt deceleration so that the answer of Step S2 is NO, a procedure of the speed change control is determined on the basis of an efficiency of energy regeneration (at Step S5). That is, in this case, although a speed change (i.e., a downshifting of the total speed change ratio) is carried out to achieve the deceleration demanded, there is no need to carry out the downshifting abruptly. Therefore, the procedure of the speed change control is determined to improve the regeneration efficiency. For example, an upshifting of the geared transmission unit 20 is carried out to reduce the revolution frequency of the first ring gear R1 of the continuously variable transmission unit 11 thereby reducing the revolution frequencies of the second electric motor M2 and the engine 8 connected therewith. At the same time, the regenerative torque of the second electric motor M2 is raised to increase the regeneration amount of energy, and the speed change ratio of the continuously variable transmission unit 11 is controlled to approximate the total speed change ratio to the target value.

Thus, in case of achieving the demanded deceleration or speed change ratio, a combination of the speed change ratios of the transmission units 11 and 20, a priority order of the transmission units to carry out a speed change, or a procedure of the speed change is changed depending on the fact that the deceleration demanded is an abrupt deceleration. More specifically, in case an abrupt deceleration is demanded, a speed change of the transmission unit having a faster speed changing rate and a better responsiveness, that is, a speed change of the continuously variable transmission unit 11 is carried out preferentially. Moreover, a ratio of the speed change ratio of the continuously variable transmission unit 11 in the total speed change ratio is increased relatively. That is, in case an abrupt deceleration is demanded, a speed change control is carried out in a manner different from that in the speed change control under the normal situation in which the engine revolution is controlled to optimize the fuel economy. On the other hand, in case the deceleration demanded is not an abrupt deceleration, a speed change control of the geared transmission unit 20 is carried out preferentially taking into consideration the regeneration efficiency. For this reason, a ratio of the speed change ratio of the geared transmission unit 20 in the total speed change ratio is increased relatively. Thus, in case an abrupt deceleration is not demanded, a speed change control is carried out in a manner different from that in the normal speed change control carried out based on the running condition of the vehicle.

As explained above, the speed change operation of the geared transmission unit 20 is carried out by engaging and releasing the clutches C1 and C2 and the brakes B1 to B3. Therefore, the deceleration may be delayed to be actually increased from the output time of the downshift signal. For this reason, subsequent to the control of Step S5, the delay in the deceleration is compensated using the wheel brake for braking the wheel (at Step S6). For example, the deceleration is ensured by applying the brake temporarily using a function of Vehicle Stability Control system (VSC™) or the like. Then, the speed change ratios of the transmission units 11 and 20 are controlled to achieve the target deceleration or the target speed change ratio (at Step S7).

Figure 3:
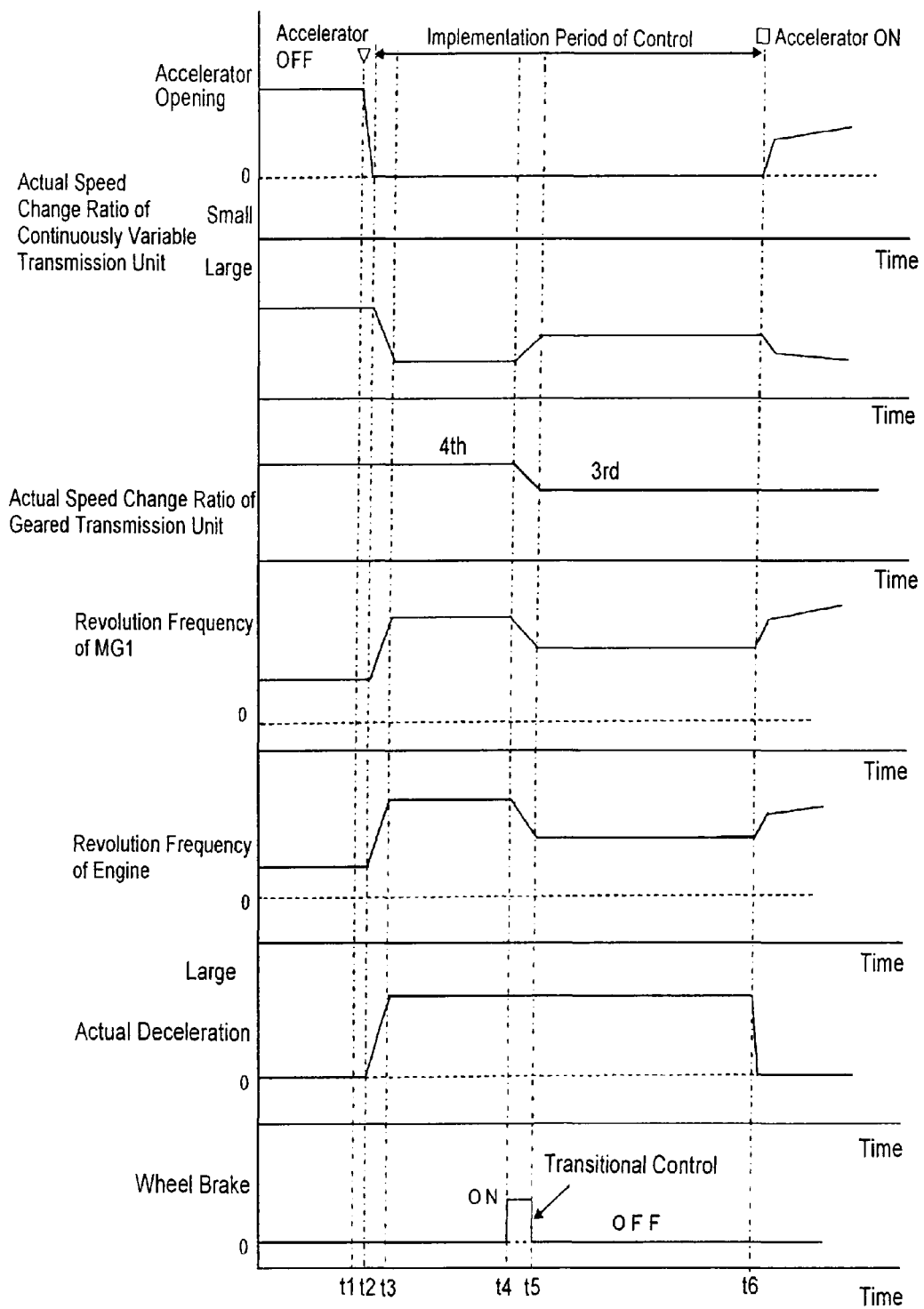
FIG. 3 is a time chart showing a case of carrying out a speed change control of the continuously variable transmission unit preferentially.

FIG. 3 is a time chart schematically showing a case of carrying out the above explained control when an abrupt deceleration is demanded. At the time t1, an abrupt deceleration is judged due to the fact that the accelerator pedal is returned abruptly. Immediately after the time t1, the control system of the invention starts carrying out the control at the time t2. First of all, the revolution frequency of the first electric motor M1 is raised to achieve the deceleration demanded. Consequently, the revolution frequency of the engine 8 is raised so that the speed change ratio of the continuously variable transmission unit 11 is increased. Also, the total speed change ratio is thereby increased so that that the actual deceleration is increased (at the time t3). As a result, the deceleration is increased abruptly, that is, the speed change is carried out in conformity with the deceleration demand.

As explained above, the revolution frequencies of the engine 8 and the first electric motor M1 are raised in this situation to achieve the deceleration demanded. This means that the fuel economy is degraded in this situation. For this reason, the running condition of the vehicle is switched to improve the fuel economy after a lapse of predetermined time. That is, a ratio between the speed change ratios of the transmission units 11 and 20 in the total speed change ratio is changed at the time t4. Specifically, the engine revolution is lowered by lowering the revolution frequency of the first electric motor M1, therefore, the speed change ratio of the continuously variable transmission unit 11 is reduced, and a down shifting of the geared transmission unit 20 is carried out. In FIG. 3, the geared transmission unit 20 is shifted from the fourth stage to the third stage. Here, the deceleration may be degraded (or deteriorated) in the course of such shifting operation (i.e., during the period from T4 to T5) due to a difference of the speed change rates between the transmission units 11 and 20 or the like. Therefore, in order to prevent such degrading of the deceleration, the wheel brake is temporarily activated as a transitional control to ensure the deceleration.

The ratio between the speed change ratios of the transmission units 11 and 20 in the total speed change ratio is changed by this shifting control. Specifically, a proportion of the speed change ratio of the continuously variable transmission unit 11 in the total speed change ratio is reduced so that the revolution frequency of the engine 8 is lowered. As a result, the fuel economy is improved and a power loss resulting from power conversion is reduced when the vehicle is running. Then, the control thus far explained is terminated when the accelerator pedal is stepped on (at the time t6), and the transmission units 11 and 20 are to be controlled in accordance with the condition of the accelerator pedal.

Here will be explained a relation between the aforementioned example and the present invention. The functional means of Steps S4 and S5 correspond to the speed change control means of the invention, and the functional means of Step S6 corresponds to the brake controlling means of the invention.

Figure 12:
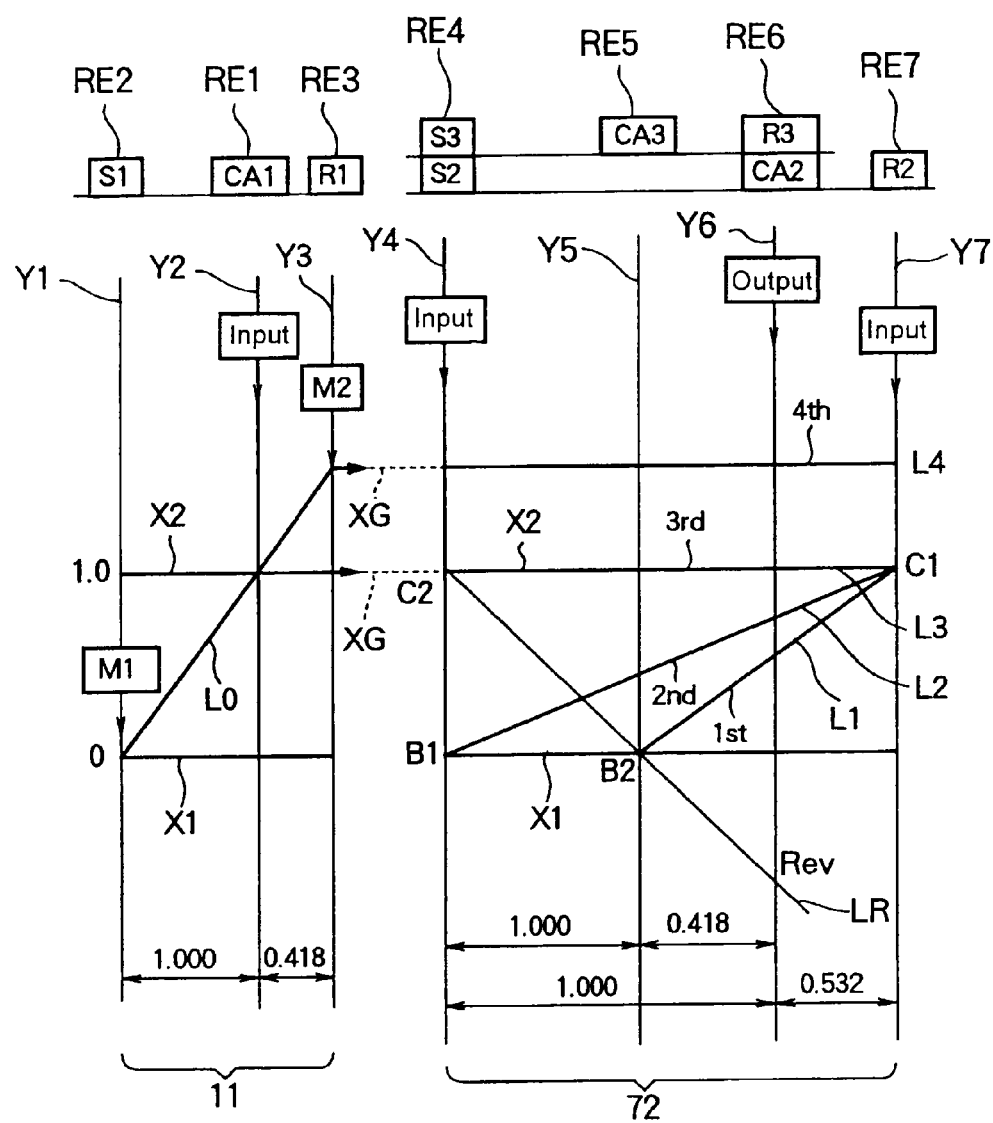
FIG. 12 is a nomographic diagram explaining operating states of the transmission units shown in FIG. 10.

A transmission to which the present invention is applied should not be limited to the transmission shown in FIG. 4. Specifically, the present invention may also be applied to a transmission comprising a geared transmission capable of setting four forward stages. An example is shown in FIGS. 10 to 12.

Figure 10:
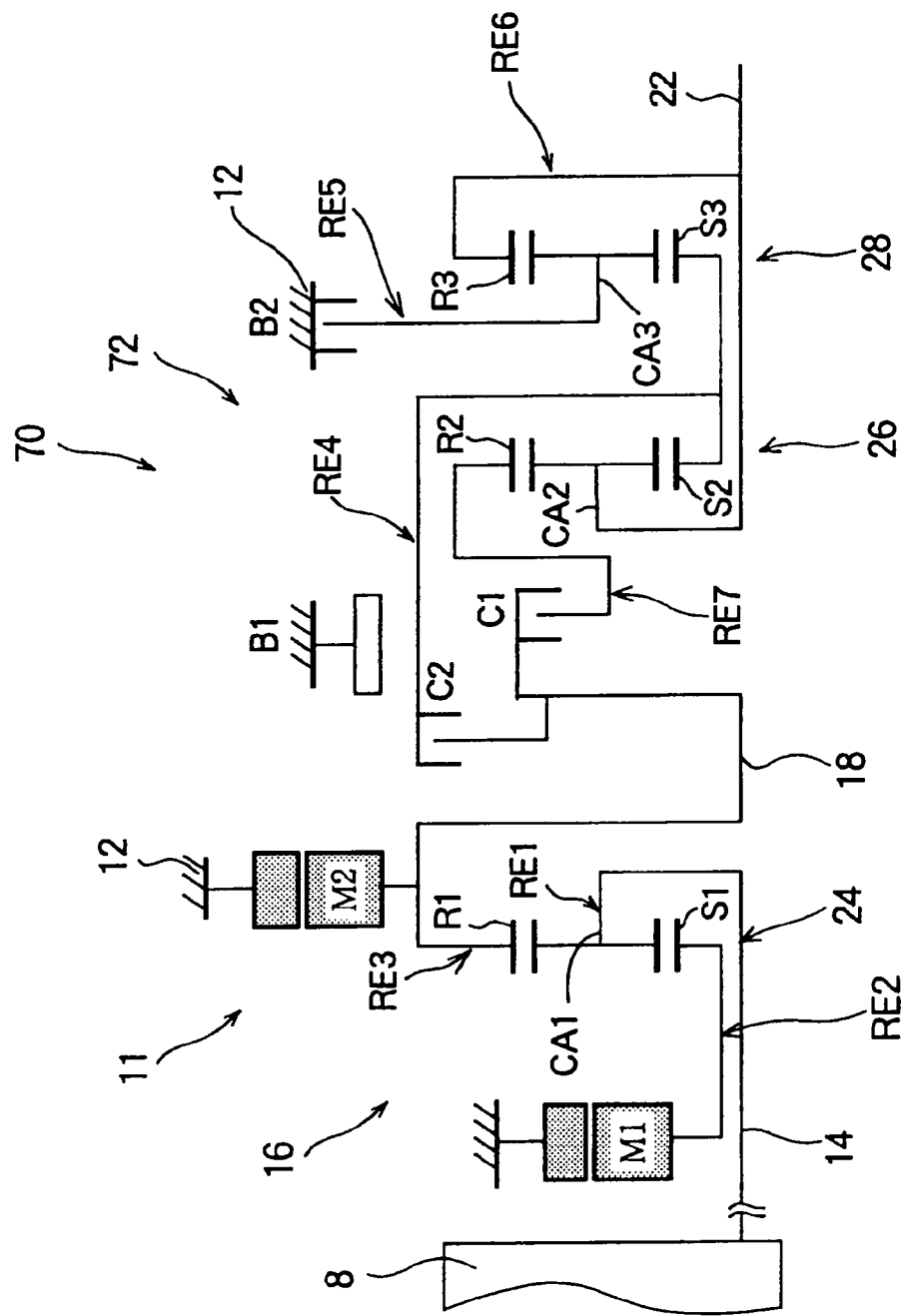
FIG. 10 is a skeleton diagram showing another example of a drive unit of a hybrid vehicle to which the invention is applied.

As the aforementioned example, the transmission 70 shown in FIG. 10 comprises: a continuously variable transmission unit 11 having a first electric motor M1, a power distribution mechanism 16, and a second electric motor M2; and a geared transmission unit 72 capable of setting three forward stages, which is connected in tandem through a transmission member 18 between the continuously variable transmission unit 11 and an output shaft 22. The power distributing mechanism 16 comprises a single pinion type first planetary gear mechanism 24 the gear ratio thereof is e.g., approximately "0.418", and it is represented by "ρ1". The geared transmission unit 72 comprises: a single pinion type second planetary gear mechanism 26 the gear ratio thereof is e.g., approximately "0.532", and it is represented by "ρ2"; and a single pinion type third planetary gear mechanism 28 the gear ratio thereof is e.g., approximately "0.418", and it is represented by "ρ3". A second sun gear S2 of the second planetary gear mechanism 26 and a third sun gear S3 of the third planetary gear mechanism 28 are connected integrally with each other. Those sun gears S2 and S3 are connected selectively to the transmission member 18 through a second clutch C2, and also connected selectively to a case 12 through a first brake B1. A second carrier CA2 of the second planetary gear mechanism 26 and a third ring gear R3 of the third planetary gear mechanism 28 are connected integrally with each other. Those carrier CA2 and ring gear R3 are connected to the output shaft 22. A second ring gear R2 of the second planetary gear mechanism 26 is connected selectively to the transmission member 18 through a first clutch C1, and a third carrier CA3 of the third planetary gear mechanism 28 is connected selectively to the case 12 through a second brake B2.

According to the transmission 70 thus far explained, as indicated in the table of FIG. 11, a first gear stage (represented as 1st in the table) to a fourth gear stage (represented as 4th in the table), a reverse gear stage (represented as R in the table), and a neutral (represented as N in the table) are achieved by selectively activating the aforementioned elements, specifically, by selectively engaging the first clutch C1, the second clutch C2, the first brake B1, and the second brake B2. As a result, a speed change ratio Y (i.e., input shaft revolution NIN/output shaft revolution NOUT), which changes substantially in equal ratio at every gear stage is obtained.

For example, if the speed change ratio of the continuously variable transmission unit 11 is kept constant, the transmission 70 functions as a geared transmission. As shown in FIG. 11: the first gear stage where the maximum value of a speed change ratio Y1 is approximately "2.804" is achieved by engaging the first clutch C1 and the second brake B2; the second gear stage where a speed change ratio Y2 is smaller than the speed change ratio of the first gear stage, e.g., approximately "1.531" is achieved by engaging the first clutch C1 and the first brake B1; the third gear stage where a speed change ratio Y3 is smaller than the speed change ratio of the second gear stage, e.g., approximately "1.000" is achieved by engaging the first clutch C1 and the second clutch C2; and the fourth gear stage where a speed change ratio Y4 is smaller than the speed change ratio of the third gear stage, e.g., approximately "0.705" is achieved by engaging the first clutch C1 and the second clutch C2. The Reverse gear stage where a speed change ratio YR is between the speed change ratios of the first and the second gear stages, e.g., "2.393" is achieved by engaging the second clutch C2 and the second brake B2. Additionally, all of the frictional engagement devices are released to achieve Neutral.

Meanwhile, in case the transmission 70 functions as a continuously variable transmission, the continuously variable transmission unit 11 functions as a continuously variable transmission, and the geared transmission unit 72 arranged in tandem therewith functions as a geared transmission. As a result, the input revolution to the geared transmission unit 72, more specifically, the revolution frequency of the transmission member 18 to be inputted individually to the first to third gear stages of the geared transmission unit 72 is varied continuously, and the individual gear stages thereby obtaining a continuous range of the speed change ratio. For this reason, the speed change ratio can be varied steplessly and continuously even between the gear stages. Consequently, a total speed change ratio YT as an entire speed change ratio of the transmission 70 can be varied steplessly.

FIG. 12 is a nomographic diagram linearly indicating a relation of revolution frequencies of the rotary elements to be connected depending on the gear stages, in the transmission 70 comprising the continuously variable transmission unit 11 functioning as a differential unit or a first transmission unit, and the geared transmission unit 72 functioning as a (an automatic) transmission unit or a second transmission unit.

In FIG. 12, four longitudinal axes Y4, Y5, Y6 and Y7 individually represents the rotary elements of the automatic transmission 72. Specifically, Y4 represents the mutually connected second sun gear S2 and third sun gear S3 corresponding to a fourth rotary element (or a fourth element) RE4, Y5 represents the third carrier CA3 corresponding to a fifth rotary element (or a fifth element) RE5, Y6 represents the mutually connected second carrier CA2 and third ring gear R3 corresponding to a sixth rotary element (or a sixth element) RE6, and Y7 represents the second ring gear R2 corresponding to a seventh rotary element (or a seventh element) RE7. In the geared transmission unit 72, the fourth rotary element RE4 is connected selectively to the transmission member 18 through the second clutch C2 and selectively to the case 12 through the first brake B1, the fifth rotary element RE5 is connected selectively to the case 12 through the second brake B2, the sixth rotary element RE6 is connected selectively to the output shaft 22 of the automatic transmission 72, and the seventh rotary element RE7 is connected selectively to the transmission member 18 through the first clutch C1.

As shown in FIG. 12, in the geared transmission unit 72, a revolution frequency of the output shaft 22 at the first gear stage is indicated at the intersection of the slant line L1 with the longitudinal axis Y6 indicating the revolution frequency of the sixth rotary element RE6 (CA2, R3) connected to the output shaft 22. Here, the line L1 is determined as a result of an engagement of the first clutch C1 and the second brake B2, and it extends from the intersection of the longitudinal axis Y7 indicating the revolution frequency of the seventh rotary element RE7 (R2) with the abscissa axis X2, to the intersection of the longitudinal axis Y5 indicating the revolution frequency of the fifth rotary element RE5 (CA3) with the abscissa axis X1. As in the case of the first gear stage: a revolution frequency of the output shaft 22 at the second gear stage is indicated at the intersection of the longitudinal axis Y6 with a slant line L2 determined as a result of engaging the first clutch C1 and the first brake B1; and a revolution frequency of the output shaft 22 at the third gear stage is indicated at the intersection of the longitudinal axis Y6 with a horizontal line L3 determined as a result of engaging the first clutch C1 and the second clutch C2. At the aforementioned first to third gear stages, the power is inputted from the continuously variable transmission unit 11 to the seventh rotary element RE7 at the revolution frequency identical to the revolution frequency Ne of the engine 8. Meanwhile, in case the first planetary gear mechanism 24 is used as a speed increasing mechanism by halting the rotation of the first sun gear S1 by the first electric motor M1, the power from the continuously variable transmission unit 11 is inputted at the revolution frequency higher than the revolution frequency NE of the engine 8. Therefore, a revolution frequency of the output shaft 22 at the fourth gear stage is indicated at the intersection of the longitudinal axis Y6 with a horizontal line L4 determined as a result of engaging the first clutch C1 and the second clutch C2.

The transmission 70 also comprises the continuously variable transmission unit 11 functioning as a differential mechanism or a first transmission unit, and the geared transmission unit 72 functioning as an automatic speed change unit or a second transmission unit. Accordingly, the advantages explained in the aforementioned example can be achieved also by this example.

Here, according to the invention, the planetary gear mechanism constituting the continuously variable transmission unit may also be a double pinion type other than the single pinion type. Further, it is also possible to provide a clutch for integrating the planetary gear mechanisms, and a brake for operating the planetary gear mechanism as a speed increasing mechanism. The present invention may also be applied to a control system for another kinds of power transmission system. Furthermore, according to the invention, either the continuously variable transmission unit and the geared transmission unit may be arranged on the engine side. Additionally, the automatic transmission of the invention may be a transmission composed of a single geared transmission, or a single continuously variable transmission. As has been explained, the present invention relates to the control system which changes the contents of the control for increasing a speed change ratio according to need. Therefore, the present invention can be applied not only to the case of increasing the speed change ratio in conformity with a deceleration demand but also to a case of increasing the speed change ratio in conformity with an acceleration demand.

INDUSTRIAL APPLICABILITY

The present invention can be utilized in a field of manufacturing and repairing automobiles such as cars, and in a field of manufacturing and processing parts for automobiles.

The invention claimed is:

1. A control system for a power transmission system, which has at least first and second transmission units having different responsiveness to a speed change and capable of setting a speed change ratio individually, and in which a total speed change ratio is determined according to the speed change ratios of the transmission units, wherein:
   the first transmission unit includes an electrical transmission unit in which a speed change ratio thereof is varied electrically, and the second transmission unit includes a mechanical transmission unit in which a speed change ratio thereof is changed by changing a torque transmitting point; and
   the control system comprising:
   speed change control means for changing a priority order to carry out a speed change operation of the individual transmission units to achieve a predetermined deceleration in conformity with a content of the deceleration demand, when the predetermined deceleration is demanded, and for carrying out a speed change of the first electrical transmission unit having a better responsiveness in priority to the second mechanical transmission unit in case an abrupt deceleration is demanded.

2. The control system for a power transmission system as claimed in claim 1, further comprising:
   a shifting device for demanding the predetermined deceleration by outputting a speed change signal.

3. The control system for a power transmission system as claimed in claim 2, wherein:
   the shifting device outputs a speed change signal including a downshift signal for increasing the speed change ratio and an upshift signal for decreasing the speed change ratio, or a down range signal for shifting a gear stage downwardly and an up range signal for shifting a gear stage upwardly, when operated manually.

4. The control system for a power transmission system as claimed in claim 3, wherein the shifting device comprises:
   an automatic position where the speed change ratio is set automatically;
   a manual position where a speed change is carry out when the downshift signal and the upshift signal or the down range signal and the up range signal are outputted; and
   a downshift position where the downshift signal or the down range signal is outputted when shifted from the manual position.

5. The control system for a power transmission system as claimed in claim 2, wherein:
   the speed change control means includes a means for changing a combination of the speed change ratios of the first and second transmission units to set a total speed change ratio for achieving the demanded deceleration, in conformity with a content of the deceleration demand.

6. The control system for a power transmission system as claimed in claim 1, wherein:
   the first transmission unit includes the electrical transmission unit which has an electric motor and in which the speed change ratio thereof is varied by changing a revolution frequency of a prime mover by electrically controlling a revolution frequency of the electric motor; and
   the speed change control means includes a means for changing a control content of the electrical transmission unit in conformity with a content of the deceleration demand.

7. The control system for a power transmission system as claimed in claim 1, wherein:
   the first electrical continuously variable transmission unit and the second mechanical transmission unit are connected in tandem so as to input power outputted from any one of those transmissions to the other one.

8. The control system for a power transmission system as claimed in claim 1, wherein:
   a speed change ratio of the power transmission system is set by both of the first electrical continuously variable transmission unit and the second mechanical transmission unit.

9. The control system for a power transmission system as claimed in claim 1:
   wherein the power transmission system is mounted on a vehicle comprising a wheel brake for braking a wheel, and
   further comprising a brake controlling means for maintaining a deceleration by actuating the wheel brake in the course of changing the speed change ratios of the speed change units.

10. The control system for a power transmission system as claimed in claim 1, wherein:
    the speed change control means includes a means for determining a combination of the speed change ratios of the speed change units in accordance with a demanded target deceleration.

11. The control system for a power transmission system as claimed in claim 1, further comprising:
    a speed change control means for carrying out a normal speed change control for determining a speed change ratio on the basis of a running condition of the vehicle on which the power transmission system is mounted and of a speed change diagram in which the speed change ratio is set in accordance with the running condition of the vehicle.

12. The control system for a power transmission system as claimed in claim 2, wherein:
    the shifting mechanism comprises a means for outputting an upshift signal or a downshift signal when operated manually.

13. The control system for a power transmission system as claimed in claim 1, further comprising:
    a regeneration mechanism for regenerating energy when decelerating the vehicle; and
    wherein the speed change control means includes a means for determining a combination of the speed change ratios of the speed change units in accordance with a regeneration efficiency of the regeneration mechanism.

14. The control system for a power transmission system as claimed in claim 1, wherein:
    the first electrical transmission unit is composed mainly of a differential gear mechanism having: an input rotary element connected with an internal combustion engine; a reaction rotary element connected with an electric motor in which a torque and a revolution frequency thereof are controlled electrically; and an output rotary element connected with the second mechanical transmission unit.

15. The control system for a power transmission system as claimed in claim 14, wherein:
    the differential gear mechanism includes a single pinion type planetary gear mechanism having a carrier functioning as an input rotary element, a sun gear functioning as the reaction rotary element, and a ring gear functioning as the output rotary element.

16. The control system for a power transmission system as claimed in claim 1, wherein:
the second mechanical transmission unit is constructed of three sets of planetary gear mechanisms and a plurality of engagement devices.

17. The control system for a power transmission system as claimed in claim 16, wherein:
the planetary gear mechanism includes a single pinion type planetary gear mechanism; sun gears of first and second planetary gear mechanisms are connected with each other; a ring gear of the first planetary gear mechanism, a carrier of the second planetary gear mechanism and a carrier of the third planetary gear mechanism are connected and those ring gear and carriers are connected with an output member; and a ring gear of the second planetary gear mechanism and a sun gear of the third planetary gear mechanism are connected with each other; and
the engagement device includes: a first clutch connecting the ring gear of the second planetary gear mechanism and the sun gear of the third planetary gear mechanism with the electrical transmission unit selectively; a second clutch connecting the sun gears of the first and second planetary gear mechanisms with the first electrical continuously variable transmission unit selectively; a first brake fixing the sun gears of the first and second planetary gear mechanisms selectively; a second brake fixing the carrier of the first planetary gear mechanism selectively; and a third brake fixing the ring gear of the third planetary gear mechanism selectively.

18. The control system for a power transmission system as claimed in claim 1, wherein:
the second mechanical transmission unit is constructed of two sets of planetary gear mechanisms and a plurality of engagement devices.

19. The control system for a power transmission system as claimed in claim 18, wherein:
the planetary gear mechanism includes a single pinion type planetary gear mechanism; sun gears of first and second planetary gear mechanisms are connected with each other; and a carrier of the first planetary gear mechanism and a ring gear of the second planetary gear mechanism are connected and those carrier and the ring gear are connected with an output member; and
the engagement device includes: a first clutch connecting the ring gear of the first planetary gear mechanism with the first electrical continuously variable transmission unit selectively; a second clutch connecting the sun gears of the first and second planetary gear mechanisms with the electrical continuously variable transmission unit selectively; a first brake fixing the sun gears of the first and second planetary gear mechanisms selectively; and
a second brake fixing the carrier of the second planetary gear mechanism selectively.

20. A control system for a power transmission system, which has at least first and second transmission units having different responsiveness to a speed change and capable of setting a speed change ratio individually, and in which a total speed change ratio is determined according to the speed change ratios of the transmission units, wherein:
the transmission unit comprises a first electrical transmission unit in which a speed change ratio thereof is varied electrically, and a second mechanical transmission unit in which a speed change ratio thereof is changed by changing a torque transmitting point; and
the control system further comprising:
a speed change control means for changing a control content of the speed change ratio of the second mechanical transmission unit in conformity with a content of the deceleration demand, and for carrying out a speed change of the first electrical transmission unit having a better responsiveness in priority to the second mechanical transmission unit in case an abrupt deceleration is demanded.

21. A control method for a power transmission system, which has at least first and second transmission units having different responsiveness to a speed change and capable of setting a speed change ratio individually, and in which a total speed change ratio is determined according to the speed change ratios of the transmission units, wherein:
the first transmission unit includes an electrical transmission unit in which a speed change ratio thereof is varied electrically, and the second transmission unit includes a mechanical transmission unit in which a speed change ratio thereof is changed by changing a torque transmitting point; and
the control method comprising:
a speed change control step of changing a priority order to carry out a speed change operation of the individual transmission units to achieve a predetermined deceleration in conformity with a content of the deceleration demand, when the predetermined deceleration is demanded, and carrying out a speed change of the first electrical transmission unit having a better responsiveness in priority to the second mechanical unit in case an abrupt deceleration is demanded.

22. The control method for a power transmission system as claimed in claim 21, further comprising:
a shifting device for demanding the predetermined deceleration by outputting a speed change signal.

23. The control method for a power transmission system as claimed in claim 22, wherein:
the shifting device outputs a speed change signal including a downshift signal for increasing the speed change ratio and an upshift signal for decreasing the speed change ratio, or a down range signal for shifting a gear stage downwardly and an up range signal for shifting a gear stage upwardly, when operated manually.

24. The control method for a power transmission system as claimed in claim 23, wherein the shifting device comprises:
an automatic position where the speed change ratio is set automatically;
a manual position where a speed change is carry out when the downshift signal and the upshift signal or the down range signal and the up range signal are outputted; and
a downshift position where the downshift signal or the down range signal is outputted when shifted from the manual position.

25. The control method for a power transmission system as claimed in claim 21, wherein:
the speed change control step includes a step of changing a combination of the speed change ratios of the first and second transmission units to set a total speed change ratio for achieving the demanded deceleration, in conformity with a content of the deceleration demand.

26. The control method for a power transmission system as claimed in claim 21, wherein:
the speed change control step includes a step of changing a control content of the mechanical transmission unit in conformity with a content of the deceleration demand.

27. The control method for a power transmission system as claimed in claim 21, wherein:

the first transmission unit includes the electrical transmission unit which has an electric motor, and in which a speed change ratio thereof is varied by changing a revolution frequency of a prime mover by electrically controlling a revolution frequency of the electric motor; and the speed change control step includes a step of changing a control content of the electrical transmission unit in conformity with a content of the deceleration demand.

28. The control method for a power transmission system as claimed in claim 21, wherein:

the first electrical continuously variable transmission unit and the second mechanical transmission unit are connected in tandem so as to input power outputted from any one of those transmissions to the other one.

29. A control system for a power transmission system, which has at least first and second transmission units having different responsiveness to a speed change and capable of setting a speed change ratio individually, and in which a total speed change ratio is determined according to the speed change ratios of the transmission units, wherein:

the first transmission unit includes an electrical transmission unit in which a speed change ratio thereof is varied electrically, and the second transmission unit includes a mechanical transmission unit in which a speed change ratio thereof is changed by changing a torque transmitting point; and the control system comprising:

a speed change control device for changing a priority order to carry out a speed change operation of the individual transmission units to achieve a predetermined deceleration in conformity with a content of the deceleration demand, when the predetermined deceleration is demanded, and for carrying out a speed change of the first electrical transmission unit having a better responsiveness in priority to the second mechanical transmission unit in case an abrupt deceleration is demanded.

* * * * *